United States Patent
Nakamura et al.

(10) Patent No.: US 11,705,281 B2
(45) Date of Patent: Jul. 18, 2023

(54) MULTILAYER CERAMIC CAPACITOR AND METHOD OF MANUFACTURING THE SAME

(71) Applicant: TAIYO YUDEN CO., LTD., Tokyo (JP)

(72) Inventors: Tomoaki Nakamura, Takasaki (JP); Mikio Tahara, Takasaki (JP); Masako Kanou, Takasaki (JP); Fusao Sato, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 17/359,238

(22) Filed: Jun. 25, 2021

(65) Prior Publication Data

US 2021/0319954 A1      Oct. 14, 2021

Related U.S. Application Data

(63) Continuation of application No. 16/410,914, filed on May 13, 2019, now Pat. No. 11,081,282.

(30) Foreign Application Priority Data

May 18, 2018   (JP) .................. 2018-095991

(51) Int. Cl.
*H01G 4/30*      (2006.01)
*H01G 4/228*     (2006.01)
(Continued)

(52) U.S. Cl.
CPC ............. *H01G 4/30* (2013.01); *H01G 4/012* (2013.01); *H01G 4/1227* (2013.01); *H01G 4/228* (2013.01)

(58) Field of Classification Search
None
See application file for complete search history.

(56) References Cited

U.S. PATENT DOCUMENTS 4,511,601 A * 4/1985 Akse ................... C04B 41/5127
                                                        427/98.5
4,604,676 A * 8/1986 Senda .................. H01G 4/2325
                                                         361/309
(Continued)

FOREIGN PATENT DOCUMENTS

CN          1238537 A   * 12/1999
JP          07057959 A  *  3/1995
(Continued)

OTHER PUBLICATIONS

A Notice of Reasons for Refusal issued by the Japanese Patent Office, dated Nov. 24, 2021, for Japanese counterpart application No. 2018-095991. (3 pages).
(Continued)

*Primary Examiner* — Timothy J. Dole
*Assistant Examiner* — Muhammed Azam
(74) *Attorney, Agent, or Firm* — Law Office of Katsuhiro Arai

(57) ABSTRACT

A multilayer ceramic capacitor includes: a multilayer chip in which dielectric layers mainly composed of ceramic and internal electrode layers are alternately stacked so that the internal electrode layers are alternately exposed to two end faces of the multilayer chip having a substantially rectangular parallelepiped shape; and a pair of external electrodes formed from the two end faces to at least one side face of side faces, wherein each external electrode includes a metal layer formed from the end face to the at least one side face and mainly composed of copper, and an oxide layer covering at least a part of the metal layer, mainly composed of copper oxide, and having a maximum thickness of 0.5 μm or greater, wherein a first surface, which is in contact with the plated layer, of the oxide layer has Cu particles formed thereon.

7 Claims, 9 Drawing Sheets

(51) Int. Cl.
  *H01G 4/012* (2006.01)
  *H01G 4/12* (2006.01)

(56) References Cited

U.S. PATENT DOCUMENTS

| | | | |
|---|---|---|---|
| 4,610,968 A | 9/1986 | Wada et al. | |
| 5,036,424 A * | 7/1991 | Yokotani | C04B 35/465 29/25.42 |
| 5,296,425 A | 3/1994 | Chazono et al. | |
| 5,792,379 A * | 8/1998 | Dai | H01L 41/187 501/134 |
| 5,852,542 A | 12/1998 | Wada et al. | |
| 5,973,390 A | 10/1999 | Amaya et al. | |
| 6,124,769 A * | 9/2000 | Igarashi | H01C 17/006 338/254 |
| 6,346,497 B1 | 2/2002 | Nakamura et al. | |
| 6,381,117 B1 | 4/2002 | Nakagawa et al. | |
| 6,673,461 B2 | 1/2004 | Chazono et al. | |
| 6,679,937 B1 * | 1/2004 | Kodas | C01G 23/003 75/363 |
| 7,446,997 B2 | 11/2008 | Kaneda et al. | |
| 7,625,420 B1 * | 12/2009 | Kodas | H01L 23/49883 106/287.18 |
| 7,710,712 B2 * | 5/2010 | Takeoka | H01G 4/30 361/321.2 |
| 7,821,770 B2 * | 10/2010 | Nishikawa | C04B 35/4682 29/25.42 |
| 8,064,190 B2 | 11/2011 | Taniguchi | |
| 8,102,639 B2 * | 1/2012 | Kasuya | H01G 4/30 29/25.42 |
| 8,917,491 B2 | 12/2014 | Masuda et al. | |
| 9,281,125 B2 | 3/2016 | Taniguchi et al. | |
| 9,502,181 B2 | 11/2016 | Suga et al. | |
| 10,056,191 B2 | 8/2018 | Ryu et al. | |
| 10,056,192 B2 | 8/2018 | Taniguchi et al. | |
| 10,290,424 B2 * | 5/2019 | Yanagisawa | H01G 4/30 |
| 10,381,156 B2 * | 8/2019 | Nishikawa | H01G 4/1227 |
| 10,431,383 B2 | 10/2019 | Morita et al. | |
| 10,431,384 B2 | 10/2019 | Morita et al. | |
| 10,515,764 B2 | 12/2019 | Mizuno et al. | |
| 10,658,116 B2 * | 5/2020 | Kim | H01G 4/2325 |
| 10,672,558 B2 | 6/2020 | Morita | |
| 10,672,559 B2 | 6/2020 | Inomata et al. | |
| 2002/0121329 A1 * | 9/2002 | Shindo | H01L 41/0471 156/89.18 |
| 2003/0175411 A1 * | 9/2003 | Kodas | H01L 21/02205 257/E21.174 |
| 2004/0126484 A1 | 7/2004 | Croswell et al. | |
| 2004/0139599 A1 * | 7/2004 | Sumiya | H01G 4/008 29/830 |
| 2005/0011857 A1 * | 1/2005 | Borland | H05K 1/162 216/13 |
| 2005/0254197 A1 | 11/2005 | Murosawa et al. | |
| 2006/0245141 A1 | 11/2006 | Shirasu et al. | |
| 2007/0109718 A1 * | 5/2007 | Horie | H01G 4/30 361/306.3 |
| 2007/0128794 A1 | 6/2007 | Kusano et al. | |
| 2008/0118721 A1 * | 5/2008 | Horie | H01G 4/30 428/209 |
| 2009/0225494 A1 | 9/2009 | Yamazaki | |
| 2009/0323253 A1 * | 12/2009 | Kobayashi | H01G 4/005 427/79 |
| 2010/0315759 A1 | 12/2010 | Masuda | |
| 2011/0019333 A1 | 1/2011 | Yao | |
| 2011/0235235 A1 | 9/2011 | Yao | |
| 2012/0171574 A1 | 7/2012 | Zhamu et al. | |
| 2012/0287553 A1 | 11/2012 | Ramani et al. | |
| 2013/0020905 A1 | 1/2013 | Sawada et al. | |
| 2013/0107419 A1 | 5/2013 | Hill et al. | |
| 2013/0222968 A1 | 8/2013 | Koga et al. | |
| 2013/0258546 A1 | 10/2013 | Kim et al. | |
| 2013/0299215 A1 | 11/2013 | Taseda et al. | |
| 2014/0029157 A1 * | 1/2014 | Kwag | H01G 4/232 361/301.4 |
| 2014/0029159 A1 | 1/2014 | Shimada et al. | |
| 2014/0125195 A1 * | 5/2014 | Ishizuka | H01G 4/12 361/321.1 |
| 2014/0376150 A1 * | 12/2014 | Kim | H01G 4/30 361/301.4 |
| 2015/0132589 A1 * | 5/2015 | Fritz | H01G 4/012 156/89.18 |
| 2015/0213953 A1 * | 7/2015 | Jun | H01G 4/30 252/512 |
| 2016/0042868 A1 | 2/2016 | Otsuka et al. | |
| 2016/0086733 A1 * | 3/2016 | Saito | H01G 4/1227 205/183 |
| 2016/0172109 A1 | 6/2016 | Kobayashi et al. | |
| 2016/0189865 A1 | 6/2016 | Kawamura et al. | |
| 2016/0189867 A1 | 6/2016 | Zaima et al. | |
| 2016/0189868 A1 | 6/2016 | Sasaki et al. | |
| 2016/0203911 A1 * | 7/2016 | Furusawa | B22F 1/107 252/514 |
| 2016/0217924 A1 | 7/2016 | Morita et al. | |
| 2016/0254094 A1 | 9/2016 | Lee et al. | |
| 2017/0032897 A1 | 2/2017 | Sasaki et al. | |
| 2017/0301468 A1 * | 10/2017 | Kim | H01G 4/2325 |
| 2017/0345564 A1 | 11/2017 | Ryu et al. | |
| 2017/0345566 A1 | 11/2017 | Tanaka | |
| 2017/0345570 A1 | 11/2017 | Sakatsume et al. | |
| 2017/0372841 A1 | 12/2017 | Kawamura et al. | |
| 2018/0061551 A1 * | 3/2018 | Kondou | H01F 27/2804 |
| 2018/0061576 A1 | 3/2018 | Nakamura et al. | |
| 2018/0068797 A1 * | 3/2018 | Chigira | H01G 4/008 |
| 2018/0139826 A1 | 5/2018 | Cho et al. | |
| 2018/0162780 A1 * | 6/2018 | Kaneda | C22C 32/0026 |
| 2018/0182552 A1 | 6/2018 | Sawada et al. | |
| 2018/0286594 A1 * | 10/2018 | Kim | H01G 4/248 |
| 2019/0027311 A1 | 1/2019 | Chigira | |
| 2019/0096577 A1 | 3/2019 | Uenishi et al. | |
| 2019/0148070 A1 | 5/2019 | Kobayashi et al. | |
| 2019/0244758 A1 | 8/2019 | Oshima et al. | |
| 2019/0272954 A1 | 9/2019 | Ariga et al. | |
| 2019/0355520 A1 * | 11/2019 | Nakamura | H01G 4/2325 |
| 2019/0362895 A1 | 11/2019 | Kobayashi et al. | |
| 2019/0371525 A1 | 12/2019 | Zaima et al. | |
| 2019/0371526 A1 | 12/2019 | Ubukata et al. | |
| 2019/0378655 A1 | 12/2019 | Iwai et al. | |
| 2019/0385794 A1 | 12/2019 | Yanagisawa et al. | |
| 2020/0115275 A1 | 4/2020 | Awagakubo et al. | |
| 2021/0027945 A1 | 1/2021 | Takahashi et al. | |
| 2021/0202154 A1 * | 7/2021 | Wakabayashi | H01F 27/32 |
| 2022/0208445 A1 * | 6/2022 | Yoshida | H01F 17/04 |
| 2022/0238278 A1 * | 7/2022 | Nishiura | H01G 4/232 |

FOREIGN PATENT DOCUMENTS

| | | |
|---|---|---|
| JP | H11111564 A | 4/1999 |
| JP | 2001076957 A | 3/2001 |
| JP | 2003022929 A | 1/2003 |
| JP | 2016066783 A | 4/2016 |
| JP | 2018032788 A | 3/2018 |

OTHER PUBLICATIONS

Final Office Action issued by U.S Patent and Trademark Office, dated Jan. 22, 2021, for related U.S. Appl. No. 16/410, 914 (21 pages).

Non-Final Office Action issued by U.S. Patent and Trademark Office, dated Jul. 24, 2020, for related U.S. Appl. No. 16/410, 914 (24 pages).

Notice of Allowance issued by U.S Patent and Trademark Office, dated Apr. 1, 2021, for related U.S. Appl. No. 16/410,914 (10 pages).

Otitoju et al., Advanced ceramic composition : Materials, Fabrication, and Applications, Journal of Industrial and Engineering Chemistry, 2020, 34-65, vol. 85 (32 pages).

* cited by examiner

COMPARATIVE EXAMPLE

EXAMPLE 1

EXAMPLE 2

EXAMPLE 3

MULTILAYER CERAMIC CAPACITOR AND METHOD OF MANUFACTURING THE SAME

CROSS-REFERENCE TO RELATED APPLICATION

This application is a continuation of U.S. patent application Ser. No. 16/410,914, filed May 13, 2019, which is based upon and claims the benefit of priority of the prior Japanese Patent Application No. 2018-095991, filed on May 18, 2018, each disclosure of which is incorporated herein by reference in its entirety. The applicant herein explicitly rescinds and retracts any prior disclaimers or disavowals made in any parent, child or related prosecution history with regard to any subject matter supported by the present application.

FIELD

A certain aspect of the present invention relates to a multilayer ceramic capacitor and a method of manufacturing the same.

BACKGROUND

After a multilayer ceramic capacitor is mounted on a substrate, the multilayer ceramic capacitor may crack because of a stress due to flexure of the substrate. Techniques for inhibiting this crack are disclosed in for example, Japanese Patent Application Publication Nos. 2001-76957 and 2018-32788 (hereinafter, referred to as Patent Documents 1 and 2). In Patent Document 1, an external electrode has a structure in which a conductive resin layer is sandwiched between a ground layer and a plated layer. In Patent Document 2, the adhesion between the external electrode and a multilayer chip is controlled by forming metal layers having different contents of ceramic on the end face and the side face.

SUMMARY OF THE INVENTION

According to a first aspect of the present invention, there is provided a multilayer ceramic capacitor including: a multilayer chip in which dielectric layers mainly composed of ceramic and internal electrode layers are alternately stacked so that the internal electrode layers are alternately exposed to two end faces of the multilayer chip, the multilayer chip having a substantially rectangular parallelepiped shape, the two end faces facing each other; and a pair of external electrodes formed from the two end faces of the multilayer chip to at least one side face of side faces of the multilayer chip, wherein each of the pair of external electrodes includes a metal layer and an oxide layer, the metal layer being formed from the end face to the at least one side face and being mainly composed of copper, the oxide layer covering at least a part of the metal layer, being mainly composed of copper oxide, and having a maximum thickness of 0.5 µm or greater.

According to a second aspect of the present invention, there is provided a method of manufacturing a multilayer ceramic capacitor, the method including: forming a ceramic multilayer structure having a substantially parallelepiped shape by alternately stacking ceramic dielectric green sheets and conductive pastes for forming internal electrode layers and alternately exposing the conductive pastes to two end faces, which face each other, of the ceramic multilayer structure; coating the ceramic multilayer structure with a metal paste mainly composed of copper; baking the metal paste to form a metal layer; and forming an oxide layer that covers at least a part of the metal layer, is mainly composed of copper oxide, and has a maximum thickness of 0.5 µm or greater by oxidizing the metal layer.

According to a third aspect of the present invention, there is provided a method of manufacturing a multilayer ceramic capacitor, the method including: forming a ceramic multilayer structure having a substantially parallelepiped shape by alternately stacking ceramic dielectric green sheets and conductive pastes for forming internal electrode layers and alternately exposing the conductive pastes to two end faces, which face each other, of the ceramic multilayer structure; coating the ceramic multilayer structure with a metal paste mainly composed of copper; firing the ceramic multilayer structure with the metal paste to form a metal layer; and forming an oxide layer that covers at least a part of the metal layer, is mainly composed of copper oxide, and has a maximum thickness of 0.5 µm or greater by oxidizing the metal layer.

DETAILED DESCRIPTION

In the techniques described in Patent Documents 1 and 2, the manufacturing cost of the multilayer ceramic capacitor may increase.

Hereinafter, an embodiment will be described with reference to the accompanying drawings.

Embodiment

Figure 1:
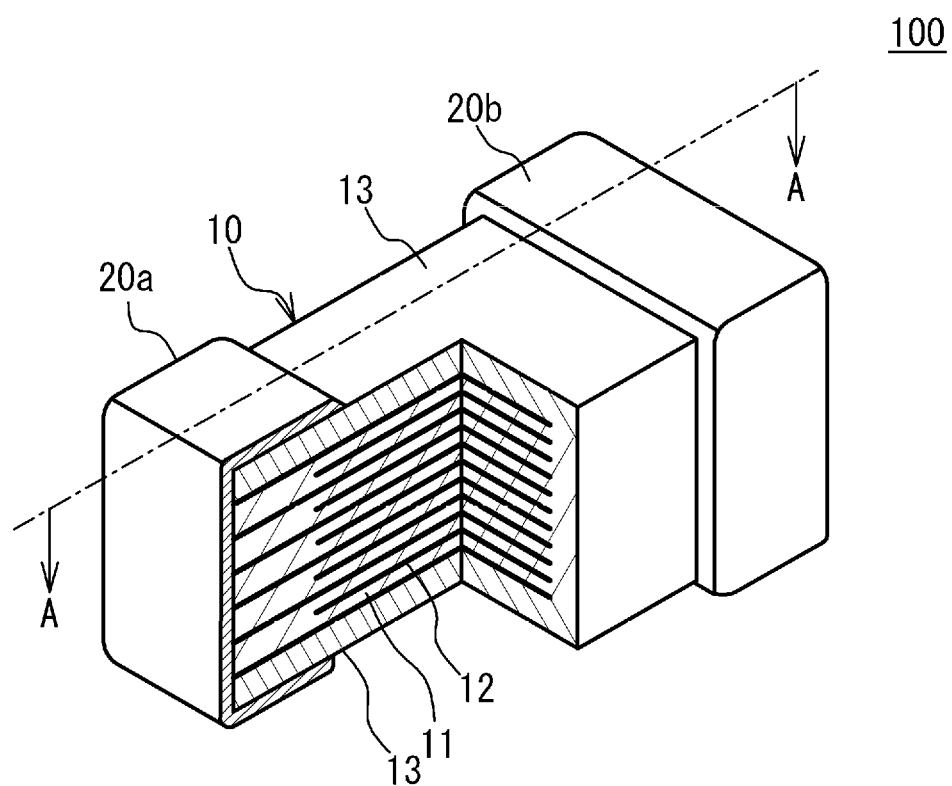
FIG. 1 is a partial cross-sectional perspective view of a multilayer ceramic capacitor.

A multilayer ceramic capacitor will be described. FIG. 1 is a partial cross-sectional perspective view of a multilayer ceramic capacitor 100. As illustrated in FIG. 1, the multilayer ceramic capacitor 100 includes a multilayer chip 10 having a rectangular parallelepiped shape, and external electrodes 20a and 20b located on two end faces facing each other of the multilayer chip 10. The four faces other than the two end faces of the multilayer chip 10 are referred to as side faces. The external electrodes 20a and 20b extend to the four side faces. The external electrodes 20a and 20b are separated from each other on the four side faces.

The multilayer chip 10 has a structure designed to have dielectric layers 11 and internal electrode layers 12 alternately stacked. The dielectric layer 11 contains a ceramic material that acts as a dielectric material. The internal electrode layer 12 contains a base metal material. The end edges of the internal electrode layers 12 are alternately exposed to a first end face and a second end face of the multilayer chip 10. The external electrode 20a is located on the first end face, and the external electrode 20b is located on the second end face. Accordingly, the internal electrode layers 12 are alternately electrically connected to the external electrode 20a and the external electrode 20b. Thus, the multilayer ceramic capacitor 100 has a structure in which a plurality of the dielectric layers 11 are stacked and each two of the dielectric layers 11 sandwich the internal electrode layer 12. In the multilayer chip 10, cover layers 13 cover two side faces corresponding to the upper surface and the lower surface of the multilayer chip 10 in the direction in which the dielectric layers 11 and the internal electrode layers 12 are stacked (hereinafter, referred to as a stack direction). The cover layer 13 is mainly composed of a ceramic material. For example, the material of the cover layer 13 is the same as that of the dielectric layer 11.

For example, the multilayer ceramic capacitor 100 may have a length of 0.25 mm, a width of 0.1 mm, and a height of 0.3 mm. The multilayer ceramic capacitor 100 may have a length of 0.6 mm, a width of 0.3 mm, and a height of 0.3 mm. The multilayer ceramic capacitor 100 may have a length of 1.0 mm, a width of 0.5 mm, and a height of 0.5 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. The dimensions of the multilayer ceramic capacitor 100 are not limited to the above dimensions.

The internal electrode layer 12 is mainly composed of a base metal such as nickel (Ni), copper (Cu), tin (Sn), or the like. The internal electrode layer 12 may be formed of a noble metal such as platinum (Pt), palladium (Pd), silver (Ag), or gold (Au), or an alloy containing the noble metal. The dielectric layer 11 is mainly composed of a ceramic material having a perovskite structure expressed by a general expression $ABO_3$. The perovskite structure includes $ABO_{3-\alpha}$ a having an off-stoichiometric composition. For example, the ceramic material is barium titanate ($BaTiO_3$), calcium zirconate ($CaZrO_3$), calcium titanate ($CaTiO_3$), strontium titanate ($SrTiO_3$), or $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure.

Figure 2A:
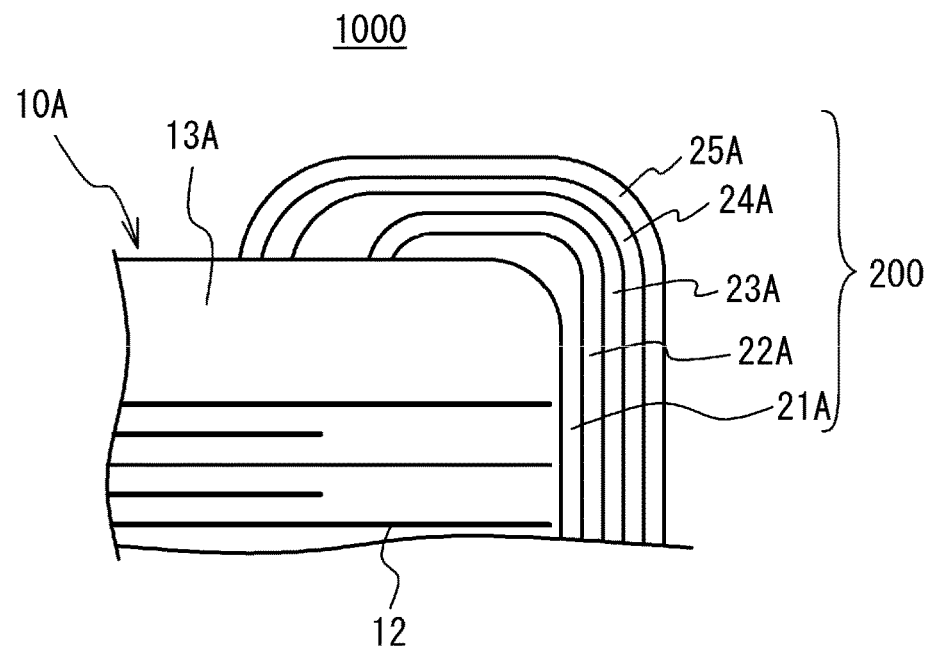
FIG. 2A and FIG. 2B are diagrams for describing an external electrode in accordance with a comparative example.

An external electrode 200 of a multilayer ceramic capacitor 1000 in accordance with a comparative example will be described. FIG. 2A is a cross-sectional view of the external electrode 200, and is a partial cross-sectional view corresponding to a cross section taken along line A-A in FIG. 1. In FIG. 2A, hatching for cross section is omitted. As illustrated in FIG. 2A, the external electrode 200 has a structure in which a Cu-plated layer 22A, a conductive resin layer 23A, a Ni-plated layer 24A, and a Sn-plated layer 25A are formed on a ground layer 21A in this order. The ground layer 21A, the Cu-plated layer 22A, the conductive resin layer 23A, the Ni-plated layer 24A, and the Sn-plated layer 25A extend from the both end faces of a multilayer chip 10A to the four side faces of the multilayer chip 10A.

The ground layer 21A is mainly composed of a metal such as Cu, Ni, aluminum (Al), or zinc (Zn), and contains a glass component for densifying the ground layer 21A or a co-material for controlling sinterability of the ground layer 21A. The ground layer 21A containing a large amount of these ceramic components has high adhesion with a cover layer 13A mainly composed of a ceramic material. The conductive resin layer 23A is a resin layer containing a metal filler such as Ag. Since the conductive resin layer 23A is flexible, the conductive resin layer 23A reduces a stress caused by flexure of the substrate on which the multilayer ceramic capacitor 1000 is mounted.

However, since the conductive resin layer 23A is formed by coating, the conductive resin layer 23A tends to be thick. Thus, the structure in which the conductive resin layer 23A is sandwiched between the ground layer 21A and a plated layer has a disadvantage in reducing the size and increasing the capacitance of the multilayer ceramic capacitor 1000. In particular, the products having low height are more affected by the thickness of the external electrodes 200a and 200b in the side portions of the multilayer chip 10A. In addition, since the conductive resin layer 23A is formed of an expensive metal such as Ag, it is costly. Thus, an external electrode 200a containing no conductive resin layer 23A is examined.

Figure 2B:
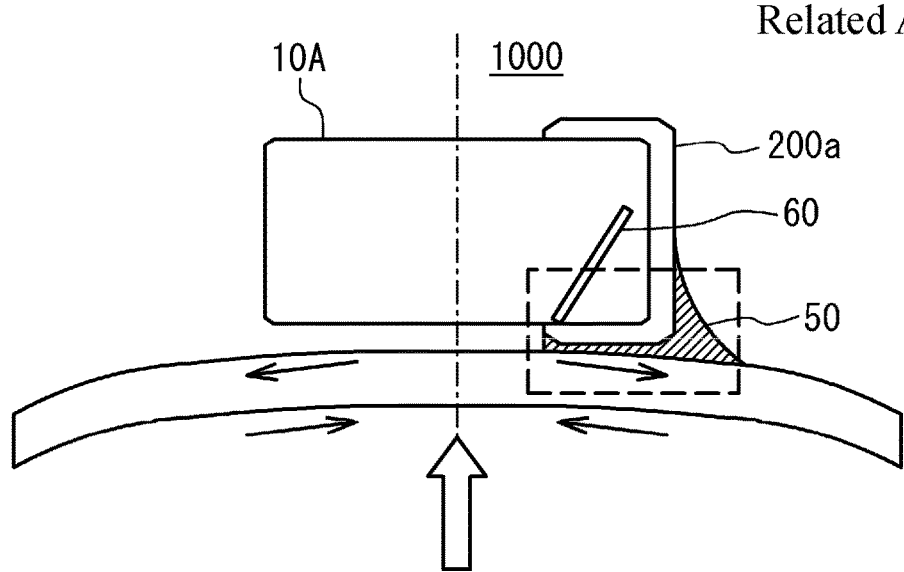

As illustrated in FIG. 2B, when the multilayer ceramic capacitor is mounted on a substrate, the external electrodes 200a on both end faces and one side face of the multilayer chip 10A are mounted by solder 50. In this case, when the substrate bends, the stress due to the flexure is transmitted to the external electrode 200a on the side face of the multilayer chip 10A. Thus, the stress is caused in the region indicated by a dashed line in FIG. 2B. As a result, a crack 60 is generated in the multilayer chip 10A.

Figure 3A:
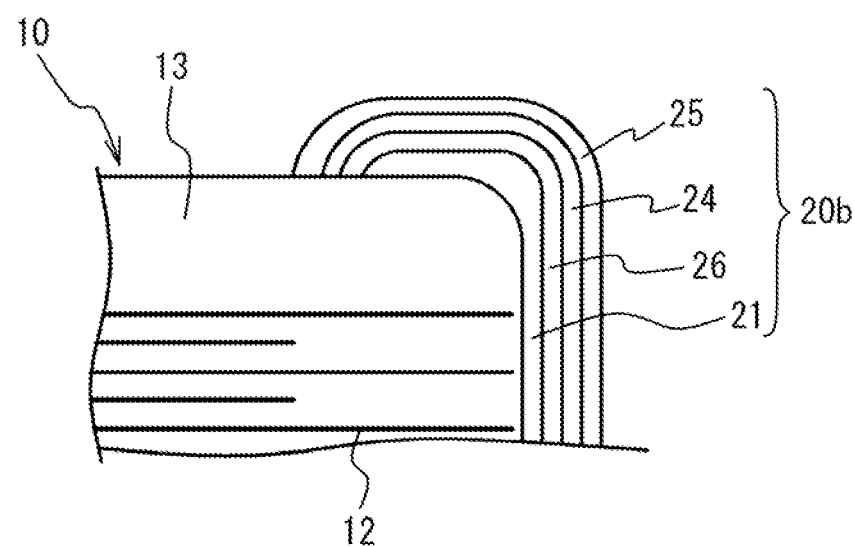
FIG. 3A and FIG. 3B are diagrams for describing an external electrode in accordance with an embodiment.

In the present embodiment, as illustrated in FIG. 3A, the external electrodes 20a and 20b have a structure in which an oxide layer 26, a Ni-plated layer 24, and a Sn-plated layer 25 are formed on a ground layer 21 on at least the side face of the multilayer chip 10. Although FIG. 3A illustrates the external electrode 20b, the external electrode 20a has the same structure. The Ni-plated layer 24 and the Sn-plated layer 25 have the same configurations as the Ni-plated layer 24A and the Sn-plated layer 25A, respectively.

The ground layer 21 is mainly composed of Cu, and contains a glass component for densifying the ground layer 21 or a co-material for controlling sinterability of the ground layer 21.

The oxide layer 26 is formed on the ground layer 21. The oxide layer 26 is mainly composed of copper oxide (CuO, $Cu_2O$) and has a maximum thickness of 0.5 μm or greater. The oxide layer 26 is preferably extend further in than the ground layer 21 in the direction in which the end faces of the inner multilayer chip 10 face each other, and is preferably in contact with the side face of the multilayer chip 10.

Figure 3B:
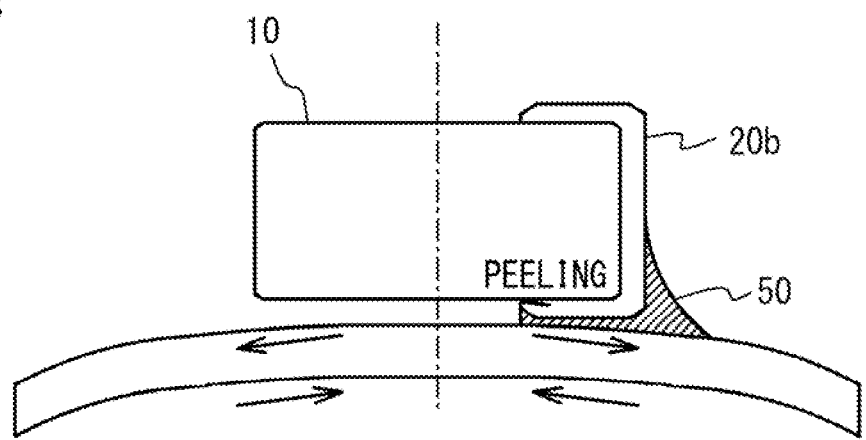

The adhesion between the oxide layer 26, which is mainly composed of copper oxide, and the ground layer 21 is weak. Furthermore, since the maximum thickness of the oxide layer 26 is 0.5 μm or greater, the oxide layer 26 is easily peeled from the ground layer 21. Accordingly, as illustrated in FIG. 3B, when the substrate on which the multilayer ceramic capacitor 100 is mounted bends, and a stress is transmitted to the side face of the multilayer chip 10, the oxide layer 26 peels from the ground layer 21. In this case, the stress from the substrate is inhibited from being transmitted to the multilayer chip 10, and thereby, the multilayer ceramic capacitor 100 is inhibited from cracking.

The multilayer ceramic capacitor 100 of the present embodiment includes the multilayer chip 10 having a substantially rectangular parallelepiped shape in which the dielectric layers 11 mainly composed of ceramic and the internal electrode layers 12 are alternately stacked and the internal electrode layers 12 are alternately exposed to the two end faces, which face each other, of the multilayer chip 10, and a pair of the external electrodes 20a and 20b formed from the two end faces to at least one side face of the side faces of the multilayer chip 10. Each of the pair of the external electrodes 20a and 20b includes the ground layer 21 that is formed from the end face to the at least one side face and is mainly composed of copper, and the oxide layer 26 that covers at least a part of the ground layer 21, is mainly composed of copper oxide, and has a maximum thickness of 0.5 µm or greater. The adhesion between the oxide layer 26, which is mainly composed of copper oxide, and the ground layer 21 is weak. Furthermore, since the maximum thickness of the oxide layer 26 is 0.5 µm or greater, the oxide layer 26 is easily peeled from the ground layer 21. Thus, when the substrate on which the multilayer ceramic capacitor 100 is mounted bends and a stress is transmitted to the side face of the multilayer chip 10, the oxide layer 26 peels from the ground layer 21. In this case, the stress from the substrate is inhibited from being transmitted to the multilayer chip 10, and the multilayer ceramic capacitor 100 is thereby inhibited from cracking.

Figure 4:
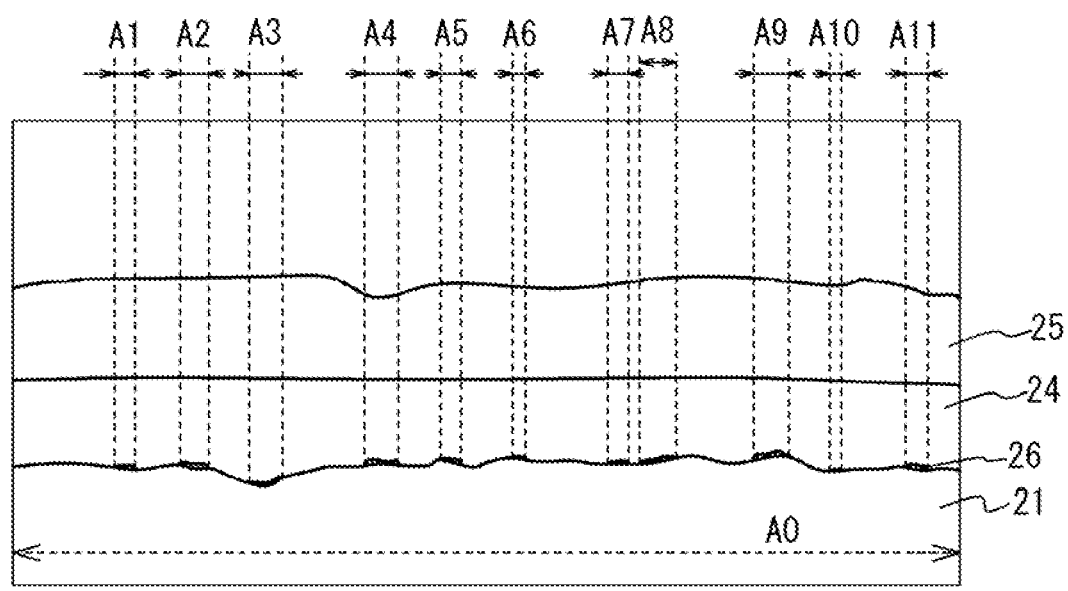
FIG. 4 is a diagram for describing a coverage.

To ease the peeling, the coverage of the ground layer 21 with the oxide layer 26 on the side face is preferably 20% or more. In other words, on the side face, 20% or more of the ground layer 21 is preferably covered with the oxide layer 26. Here, the coverage of the ground layer 21 with the oxide layer 26 can be defined as the proportion of the area of the oxide layer 26 per unit area of the ground layer 21 ($\Sigma An/A0$), i.e., $\{(A1+A2+ \ldots +An)/A0\}$ wherein "n" is an integer. The coverage of the ground layer 21 with the oxide layer 26 can be obtained by measuring the areas A1, A2, . . . , An of the oxide layer 26 within the observation region having the area A0 in the ground layer 21 as illustrated in FIG. 4 wherein n=11 (i.e., A1 to A11), and then dividing the sum of the areas A1, A2, . . . , An of the oxide layer 26 by the unit area A0 of the ground layer 21.

Figure 5:
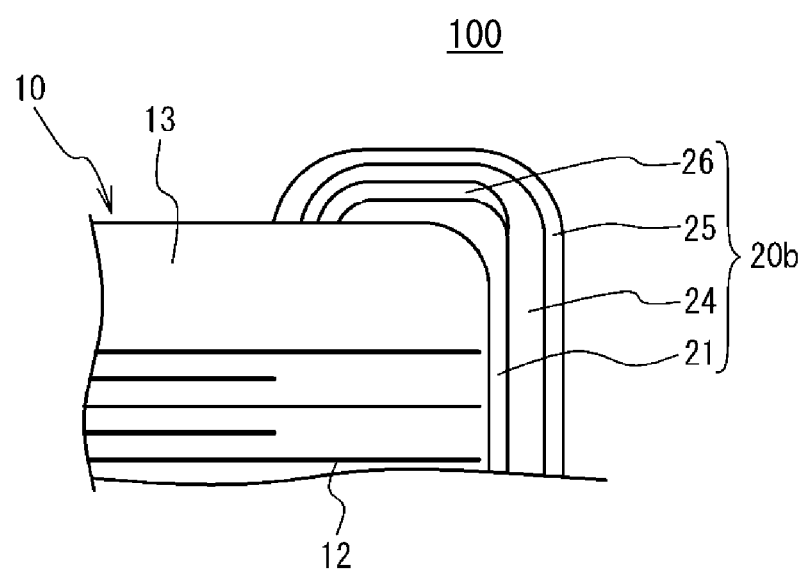
FIG. 5 is a diagram for describing another example of the external electrode in accordance with the embodiment.

To secure the conductivity and the adhesion, when the maximum thickness of the oxide layer 26 is 2.0 µm or greater, as illustrated in FIG. 5, the oxide layer 26 is preferably not formed on the end faces. That is, the coverage of the ground layer 21 with the oxide layer 26 on the side face acting as a surface for mounting the multilayer chip 10 on the substrate is preferably greater than the coverage of the ground layer 21 with the oxide layer 26 on the end face.

When at least a part of each of the external electrodes 20a and 20b on the side face acting as a surface for mounting the multilayer chip 10 on the substrate has the oxide layer 26, the stress from the substrate is reduced. Therefore, it is sufficient if the external electrodes 20a and 20b on the side face functioning as a surface for mounting the multilayer chip 10 on the substrate have the oxide layer 26.

Figure 6:
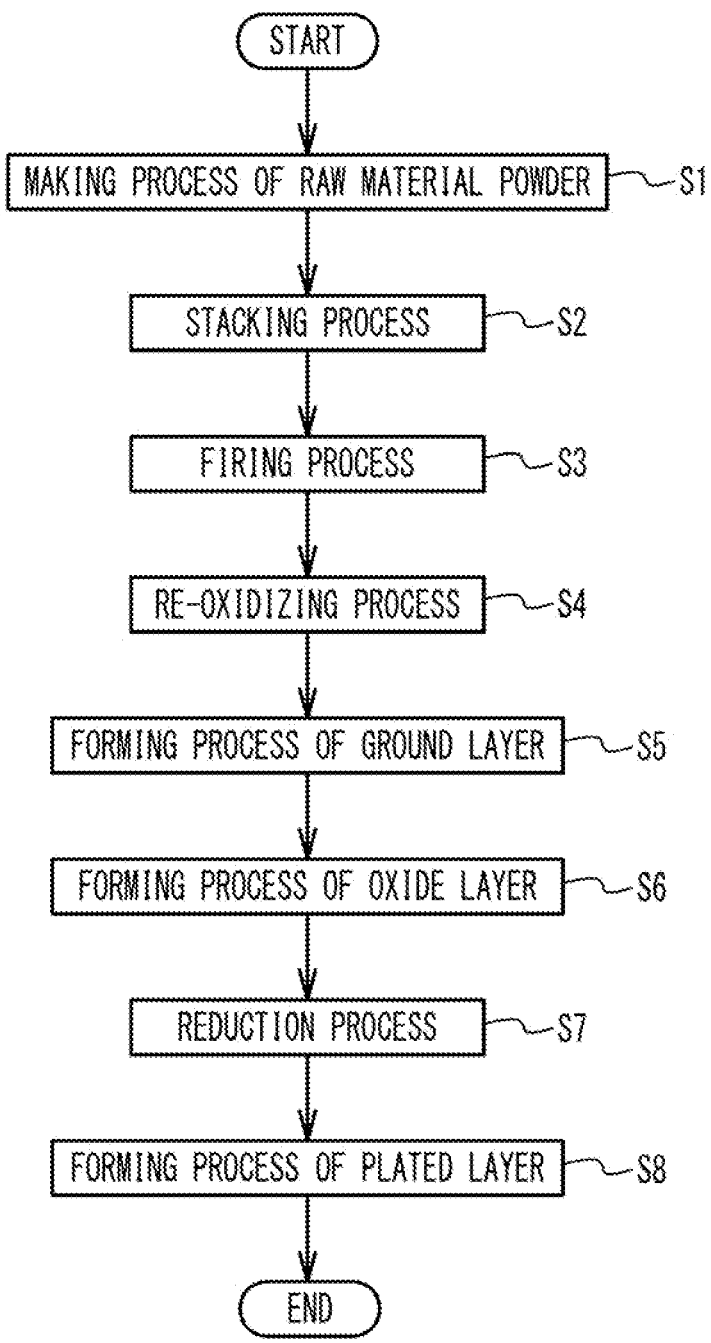
FIG. 6 is a flowchart of a method of manufacturing the multilayer ceramic capacitor in accordance with the embodiment.

Next, a method of manufacturing the multilayer ceramic capacitor 100 will be described. FIG. 6 is a flowchart of the method of manufacturing the multilayer ceramic capacitor 100.

Making Process of Raw Material Powder (S1)

An additive compound predetermined in accordance with purposes may be added to powder of the ceramic material that is the main component of the dielectric layer 11. The additive compound may be an oxide of magnesium (Mg), manganese (Mn), vanadium (V), chrome (Cr), or rare-earth elements (yttrium (Y), dysprosium (Dy), thulium (Tm), holmium (Ho), terbium (Tb), ytterbium (Yb), samarium (Sm), europium (Eu), gadolinium (Gd), and erbium (Er)), an oxide of cobalt (Co), Ni, lithium (Li), B, sodium (Na), potassium (K), or Si, or glass. For example, a compound containing the additive compound is mixed with the ceramic material powder, and the resultant ceramic material powder is calcined. Then, the resultant ceramic material powder is wet-blended with the additive compound. After that, the ceramic material powder with the additive compound is dried and crushed to prepare desired ceramic material powder.

Stacking Process (S2)

Then, a binder such as a polyvinyl butyral (PVB) resin, an organic solvent such as ethanol or toluene, and a plasticizer are added to the prepared ceramic material powder and wet-blended. With use of the resultant slurry, a strip-shaped dielectric green sheet with a thickness of, for example, 0.8 µm or less is applied on a base material by, for example, a die coating method or a doctor blade method, and then dried.

Then, a pattern of the internal electrode layer 12 is arranged on the surface of the dielectric green sheet by printing a conductive paste for forming an internal electrode layer by screen printing or gravure printing. The conductive paste for forming an internal electrode layer contains powder of the main component metal of the internal electrode layer 12, a binder, a solvent, and auxiliary agents as necessary. It is preferable that the binder and the solvent differ from the above-described ceramic slurry. A ceramic material that is the main component of the ceramic dielectric layer 11 may be dispersed, as a co-material, in the conductive paste for forming an internal electrode layer Then, the dielectric green sheet on which the internal electrode layer pattern is printed is stamped into a predetermined size, and the predetermined number (for example, 200 to 500) of stamped dielectric green sheets are stacked while the base material is peeled so that the internal electrode layers 12 and the ceramic dielectric layers 11 are alternated with each other and the end edges of the internal electrode layers 12 are alternately exposed to both end faces in the length direction of the ceramic dielectric layer 11 so as to be alternately led out to a pair of external electrodes having different polarization. Cover sheets, which are to be the cover layers 13, are stacked on the stacked green sheets and under the stacked green sheets and are thermally compressed. The resultant multilayer structure is cut into a predetermined size (for example, 1.0 m×0.5 mm). Through these processes, a ceramic multilayer structure having a substantially rectangular parallelepiped shape is obtained.

Firing Process (S3)

The binder is removed in an $N_2$ atmosphere at 250° C. to 500° C. The resultant ceramic multilayer structure is fired in a reducing atmosphere at 1100° C. to 1300° C. for 10 minutes to 2 hours. Thus, each compound structuring the dielectric green sheet is sintered, and grains of each compound grow. In this manner, the multilayer ceramic capacitor 100 having the multilayer chip 10 in which the sintered dielectric layers 11 and the internal electrode layers 12 are alternately stacked and the cover layers 13 formed as the outermost layers in the stacking direction is obtained.

Re-Oxidizing Process (S4)

Thereafter, the sintered structure may be subjected to a re-oxidizing treatment in a $N_2$ gas atmosphere at 600° C. to 1000° C.

Then, the external electrodes 20a and 20b are formed on the multilayer chip 10.

Forming Process of the Ground Layer (S5)

The end faces of the multilayer chip 10 are dipped into a metal paste containing a Cu filler, glass frit, a binder, and a solvent. After that, the multilayer chip 10 is lifted up. Accordingly, the both end faces of the multilayer chip 10 are coated with the metal paste. The metal paste is then dried.

Thereafter, the metal paste is baked as a part of the forming process of the ground layer (S5). Thus, the ground layer 21 mainly composed of Cu is formed. The binder and the solvent are vaporized by the baking.

Forming Process of the Oxide Layer (S6)

Thereafter, the multilayer chip 10 is subjected to various heat treatments to oxidize the ground layer 21. Through this process, the oxide layer 26 that is mainly composed of copper oxide and has a maximum thickness of 0.5 µm or greater is formed on the ground layer 21.

Reduction Process (S7)

Figure 7:
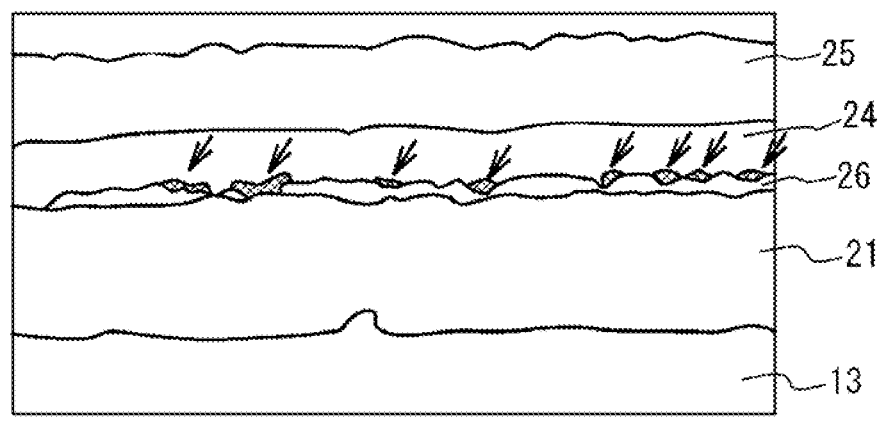
FIG. 7 is a diagram drawing the picture of the cross-section of the multilayer ceramic capacitor in accordance with the embodiment.

It is difficult to form the Ni-plated layer 24 directly on the oxide layer 26. Thus, a reduction treatment is conducted to form Cu particles on the surface of the oxide layer 26. Through the reduction treatment, as indicated by arrows in FIG. 7, metal particles are formed on the surface of the oxide layer 26. Therefore, the Ni-plated layer 24 is enabled to be formed on the oxide layer 26.

Forming Process of the Plated Layer (S8)

Thereafter, the Ni-plated layer 24 and the Sn-plated layer 25 are formed on the oxide layer 26 by plating.

Figure 8:
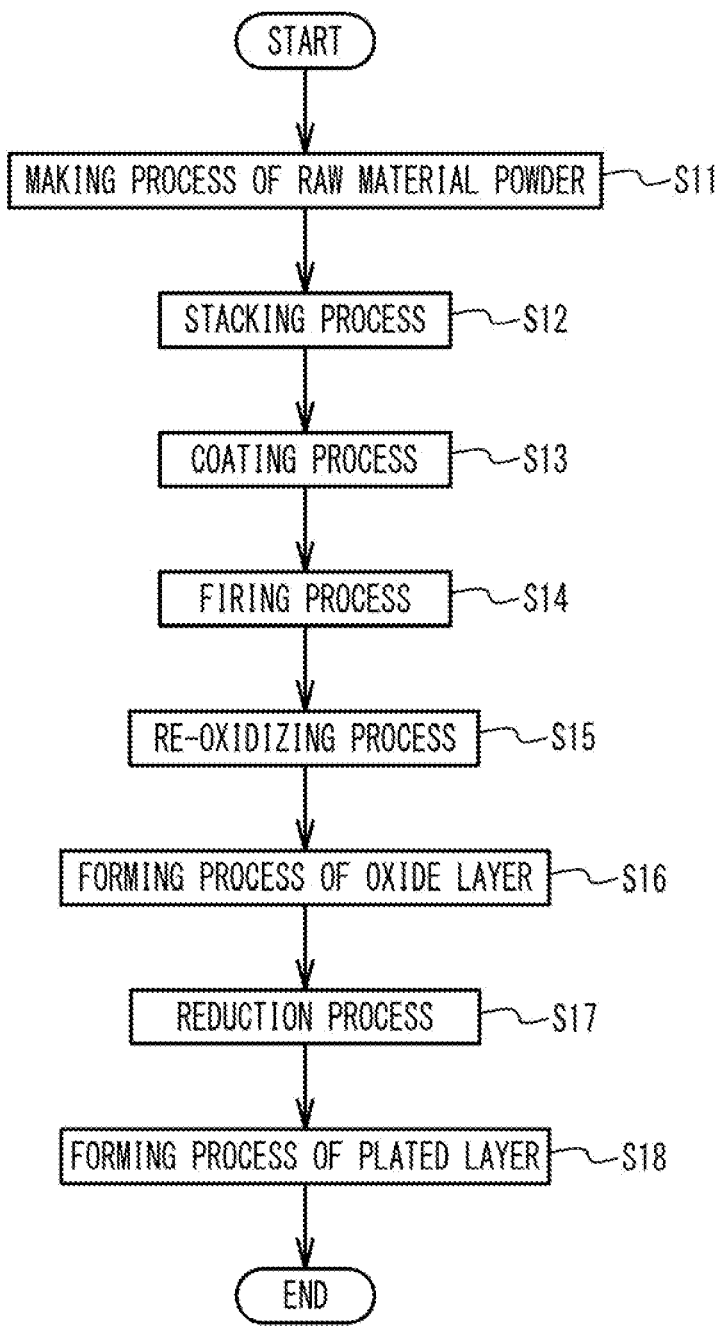
FIG. 8 is a flowchart of another method of manufacturing the multilayer ceramic capacitor in accordance with the embodiment.

The ground layer 21 may be fired together with the multilayer chip 10. A manufacturing method for this case is illustrated in FIG. 8. The making process of the raw material powder (S11) and the stacking process (S12) are the same as S1 and S2, respectively.

Coating Process (S13)

The binder of the ceramic multilayer structure obtained through the stacking process is removed in a $N_2$ atmosphere at 250° C. to 500° C. Then, the end faces of the resultant ceramic multilayer structure are coated with a metal paste containing a Cu filler, a co-material, a binder, and a solvent. Then, the metal paste is dried.

Firing Process (S14)

Thereafter, the metal paste is fired together with the ceramic multilayer structure. This process forms the ground layer 21 mainly composed of Cu. Thereafter, the ceramic multilayer structure may be subjected to a re-oxidation treatment (S15) in a $N_2$ gas atmosphere at 600° C. to 1000° C.

Forming Process of the Oxide Layer (S16)

Thereafter, the multilayer chip 10 is subjected to various heat treatments to oxidize the ground layer 21. Through this process, the oxide layer 26 that is mainly composed of copper oxide and has a maximum thickness of 0.5 µm or greater is formed on the ground layer 21.

Reduction Process (S17)

It is difficult to form the Ni-plated layer 24 directly on the oxide layer 26. Thus, a reduction treatment is conducted to form Cu particles on the surface of the oxide layer 26.

Forming Process of the Plated Layer (S18)

Thereafter, the Ni-plated layer 24 and the Sn-plated layer 25 are formed on the oxide layer 26 by plating.

According to the manufacturing method of the present embodiment, the oxide layer 26 that covers at least a part of the ground layer 21, is mainly composed of copper oxide, and has a maximum thickness of 0.5 µm or greater is formed on the ground layer 21. The oxide layer 26 mainly composed of copper oxide does not have enough adhesion with the ground layer 21. Furthermore, since the oxide layer 26 has a maximum thickness of 0.5 µm or greater, the oxide layer 26 is easily peeled from the ground layer 21. Thus, when the substrate on which the multilayer ceramic capacitor 100 is mounted bends and a stress is transmitted to the side face of the multilayer chip 10, the oxide layer 26 peels from the ground layer 21. In this case, the stress from the substrate is inhibited from being transmitted to the multilayer chip 10, and thereby, the multilayer ceramic capacitor 100 is inhibited from cracking. In addition, the oxide layer 26 is formed by oxidizing the ground layer 21, and therefore easily manufactured. Therefore, the manufacturing cost is thus reduced.

To secure the conductivity and the adhesion, in the manufacturing method of the present embodiment, when the oxide layer 26 has a maximum thickness of 2.0 µm or greater, after the oxide layer 26 is formed, a mechanical shock is preferably applied to the end face to remove the oxide layer 26 on the end face. After that, the Ni-plated layer 24 and the Sn-plated layer 25 are formed by plating. Through this process, the multilayer ceramic capacitor in which the coverage of the ground layer 21 with the oxide layer 26 on the side face is higher than the coverage of the ground layer 21 with the oxide layer 26 on the end face is obtained. The oxide layer 26 on the end face may be removed by masking the oxide layer 26 on the side face, and then dissolving the oxide layer 26 on the end face.

In the present embodiment, Cu particles are formed on the surface of the oxide layer 26 through the reduction treatment after the oxide layer 26 is formed, but this does not intend to suggest any limitation. For example, after the oxide layer 26 is formed, Cu particles may be formed by plating.

In the present embodiment, the ground layer 21 is an example of a metal layer that is formed from the end face to at least one side face of side faces and is mainly composed of copper. The oxide layer 26 is an example of an oxide layer that covers at least a part of the metal layer, is mainly composed of copper oxide, and has a maximum thickness of 0.5 µm or greater.

EXAMPLES

The multilayer ceramic capacitor of the embodiment was fabricated, and its characteristics were examined.

Examples 1 through 3

The sintered multilayer chip 10 with no external electrode is prepared. The multilayer chip 10 has a length of 1.0 mm, a width of 0.5 mm, and a height of 0.5 mm, and has a capacitance of 10 µF.

The multilayer chip 10 was coated with a metal paste containing a Cu filler, glass frit, a binder, and a solvent, and the metal paste was then dried. Thereafter, the metal paste was baked. Accordingly, the ground layer 21 mainly composed of Cu was formed. The binder and the solvent were vaporized by the baking.

Thereafter, various heat treatments were conducted to oxidize the surface of the ground layer 21 to form the oxide layer 26. Table 1 lists the maximum thickness of the oxide layer 26 and the coverage of the ground layer 21 with the oxide layer 26 on the side face of the multilayer chip 10 in each of the examples 1 through 3.

TABLE 1

|  | Comparative example | Example 1 | Example 2 | Example 3 |
|---|---|---|---|---|
| Maximum thickness of the oxide layer [µm] | 0 | 0.5 | 2.2 | 5.8 |
| Coverage [%] | 0.0 | 24.6 | 100.0 | 100.0 |

After the oxide layer 26 was formed, the reduction treatment was conducted to form Cu particles on the surface of the oxide layer 26. Thereafter, the Ni-plated layer 24 and the Sn-plated layer 25 were formed on the oxide layer 26 by plating. Ten samples of each of the examples 1 through 3 were fabricated.

In the comparative example, after the ground layer 21 was formed, the Ni-plated layer 24 and the Sn-plated layer 25 were formed on the ground layer 21 by plating without forming the oxide layer 26. Ten samples of the comparative example were fabricated.

The samples of each of the examples 1 through 3 and the comparative example were subjected to a bending test (pushing depth: 10 mm), and an incidence rate of cracks and an incidence rate of decrease in capacitance after the bending test were examined. Table 2 presents results of the bending test. In the comparative example, a crack was generated and the capacitance decreased. In contrast, in the examples 1 through 3, the incidence rate of cracks and the incidence rate of decrease in capacitance were reduced to 0/10. It was defined that the decrease in capacitance occurred when the capacitance decreased by 12.5% or greater. The reason why the incidence rate of cracks and the incidence rate of decrease in capacitance were reduced in the examples 1 through 3 is considered because the oxide layer 26 peeled from the ground layer 21 when the stress due to flexure was transmitted to the external electrodes 20a and 20b.

TABLE 2

|  | Comparative example | Example 1 | Example 2 | Example 3 |
|---|---|---|---|---|
| Incidence rate of decrease in capacitance | 6/10 | 0/10 | 0/10 | 0/10 |
| Incidence rate of cracks | 6/10 | 0/10 | 0/10 | 0/10 |

The cross-section (the cross-section taken along line A-A in FIG. 1) of the sample of the comparative example in which a crack was generated and the cross-sections (the cross-section taken along line A-A in FIG. 1) of the samples of the examples 1 through 3 were checked. FIG. 9A through FIG. 9D are diagrams drawing the pictures of the cross-sections of the samples of the comparative example and the examples 1 through 3, respectively.

Figure 9A:
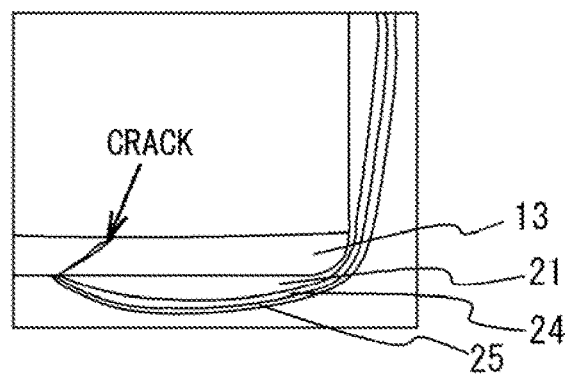
FIG. 9A through FIG. 9D are diagrams drawing the pictures of the cross-sections of multilayer ceramic capacitors of the comparative example and examples 1 through 3.
Figure 9B:
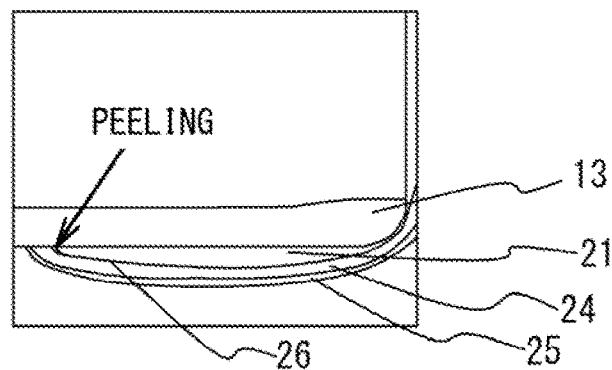
Figure 9C:
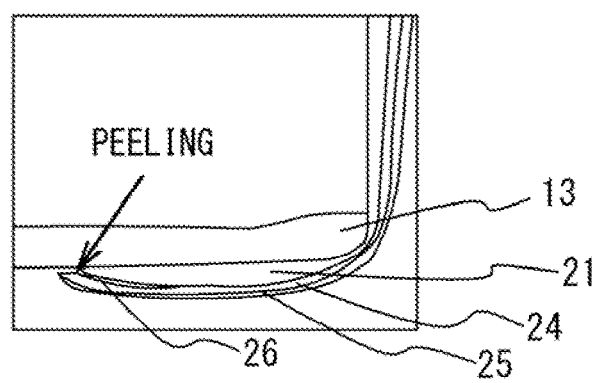
Figure 9D:
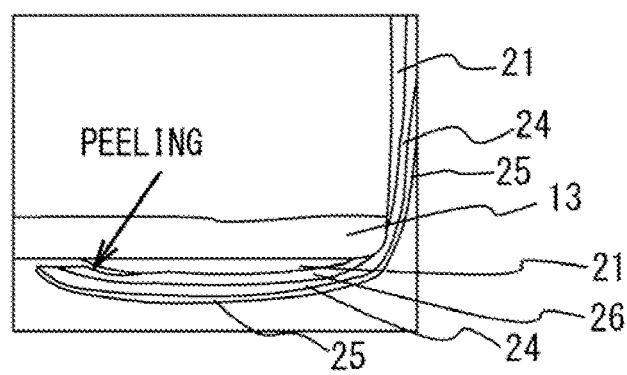

As presented in FIG. 9A, in the sample of the comparative example, a crack was generated. However, as presented in FIG. 9B through FIG. 9D, in the examples 1 through 3, no crack was observed, and the peeling of the oxide layer 26 from the ground layer 21 was observed.

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
a multilayer chip in which dielectric layers mainly composed of ceramic and internal electrode layers are alternately stacked so that the internal electrode layers are alternately exposed to two end faces of the multilayer chip, the multilayer chip having a substantially rectangular parallelepiped shape, the two end faces facing each other; and
a pair of external electrodes formed from the two end faces of the multilayer chip to at least one side face of side faces of the multilayer chip,
wherein each of the pair of external electrodes includes a metal layer, an oxide layer, and a plated layer, the metal layer being formed from the end face to the at least one side face and being mainly composed of copper, the oxide layer covering at least a part of the metal layer, being mainly composed of copper oxide, and having a maximum thickness of 0.5 µm or greater, the oxide layer being interposed between the metal layer and the plated layer in a thickness direction of the metal layer and the plated layer,
wherein a coverage on the at least one side face is higher than a coverage on the end face, the coverage being defined as a proportion of an area of the oxide layer formed on the metal layer per unit area of the metal layer, and
wherein a first surface, which is in contact with the plated layer, of the oxide layer has a plurality of Cu particles formed thereon, which are separated by oxide of the oxide layer.

2. The multilayer ceramic capacitor according to claim 1, wherein the coverage on the at least one side face is 20% or greater.

3. The multilayer ceramic capacitor according to claim 1, wherein the oxide layer extends closer to a center of the multilayer chip than the metal layer in a direction in which the two end faces of the multilayer chip face each other, and is in contact with the at least one side face.

4. A method of manufacturing a multilayer ceramic capacitor, the method comprising:
forming a ceramic multilayer structure having a substantially parallelepiped shape by alternately stacking ceramic dielectric green sheets and conductive pastes for forming internal electrode layers and alternately exposing the conductive pastes to two end faces, which face each other, of the ceramic multilayer structure;
coating the ceramic multilayer structure with a metal paste mainly composed of copper;
baking the metal paste to form a metal layer;
forming an oxide layer that covers at least a part of the metal layer, is mainly composed of copper oxide, and has a maximum thickness of 0.5 µm or greater by oxidizing the metal layer so that a coverage on the at least one side face is higher than a coverage on each of the two end faces, the coverage being defined as a proportion of an area of the oxide layer formed on the metal layer per unit area of the metal layer;
forming a plurality of Cu particles on a first surface of the oxide layer by reduction treatment, wherein the plurality of Cu particles are separated by oxide of the oxide layer; and
forming a plated layer on the first surface of the oxide layer so that the oxide layer is interposed between the metal layer and the plated layer in a thickness direction of the metal layer and the plated layer.

5. The method according to claim 4, wherein
the forming of the plated layer includes forming the plated layer after the oxide layer on each of the end faces is removed by applying a mechanical shock to the oxide layer on each of the end faces when the oxide layer on each of the end faces has a maximum thickness of 2.0 µm or greater.

6. A method of manufacturing a multilayer ceramic capacitor, the method comprising:

forming a ceramic multilayer structure having a substantially parallelepiped shape by alternately stacking ceramic dielectric green sheets and conductive pastes for forming internal electrode layers and alternately exposing the conductive pastes to two end faces, which face each other, of the ceramic multilayer structure;

coating the ceramic multilayer structure with a metal paste mainly composed of copper;

firing the ceramic multilayer structure with the metal paste to form a metal layer;

forming an oxide layer that covers at least a part of the metal layer, is mainly composed of copper oxide, and has a maximum thickness of 0.5 μm or greater by oxidizing the metal layer so that a coverage on the at least one side face is higher than a coverage on each of the two end faces, the coverage being defined as a proportion of an area of the oxide layer formed on the metal layer per unit area of the metal layer; and forming a plated layer so that the oxide layer is interposed between the metal layer and the plated layer in a thickness direction of the metal layer and the plated layer;

forming a plurality of Cu particles on a first surface of the oxide layer by reduction treatment, wherein the plurality of Cu particles are separated by oxide of the oxide layer; and, forming a plated layer on the first surface of the oxide layer so that the oxide layer is interposed between the metal layer and the plated layer in a thickness direction of the metal layer and the plated layer.

7. The method according to claim 6, wherein the forming of the plated layer includes forming the plated layer after the oxide layer on each of the end faces is removed by applying a mechanical shock to the oxide layer on each of the end faces when the oxide layer on each of the end faces has a maximum thickness of 2.0 μm or greater.

* * * * *